United States Patent
Niu et al.

(10) Patent No.: US 10,053,576 B2
(45) Date of Patent: Aug. 21, 2018

(54) MOLDING MATERIAL FOR A HOUSEHOLD PLUMBING EQUIPMENT AND A HOUSEHOLD PLUMBING EQUIPMENT FABRICATED USING THE SAME

(71) Applicant: Panasonic Intellectual Property Management Co., Ltd., Osaka (JP)

(72) Inventors: Takaya Niu, Osaka (JP); Kazumasa Rokushima, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/411,320

(22) Filed: Jan. 20, 2017

(65) Prior Publication Data

US 2017/0183495 A1    Jun. 29, 2017

Related U.S. Application Data

(63) Continuation of application No. 13/634,989, filed as application No. PCT/JP2011/056370 on Mar. 17, 2011.

(30) Foreign Application Priority Data

Mar. 25, 2010   (JP) ................. 2010-070945

(51) Int. Cl.
*E03D 1/00* (2006.01)
*C08L 67/02* (2006.01)
(Continued)

(52) U.S. Cl.
CPC ............... *C08L 67/02* (2013.01); *A47K 1/00* (2013.01); *C08L 33/12* (2013.01); *E03D 11/02* (2013.01); *E03C 1/14* (2013.01)

(58) Field of Classification Search
None
See application file for complete search history.

(56) References Cited

U.S. PATENT DOCUMENTS 6,537,660 B2 * 3/2003 Katayama ................. D01F 6/46
264/172.17
2004/0076823 A1    4/2004 Yoshimura
(Continued)

FOREIGN PATENT DOCUMENTS

JP    2003-231797 A    8/2003
JP    2006-290951 A    10/2006
(Continued)

OTHER PUBLICATIONS

Translation of JP 2008-150598.*
(Continued)

*Primary Examiner* — Lauren Crane
(74) *Attorney, Agent, or Firm* — Renner, Otto, Boisselle & Sklar, LLP

(57) ABSTRACT

A method of manufacturing a thermoplastic resin for a household plumbing equipment includes: reacting an acid component including a terephthalic acid and a glycol component including a trimethylene glycol derived from a plant to form a poly trimethylene terephthalate resin as a condensation polymer of a formed glycol ester; and combining the poly trimethylene terephthalate resin with a polymethyl methacrylate resin in a mass ratio of 90:10-50:50 to form a thermoplastic resin, wherein the thermoplastic resin includes the polymethyl methacrylate resin and the polytrimethylene terephthalate resin in an amount of 80% or more by mass of a total amount of the formed thermoplastic resin.

4 Claims, 2 Drawing Sheets

(51) Int. Cl.
   *C08L 33/12*   (2006.01)
   *A47K 1/00*   (2006.01)
   *E03D 11/02*   (2006.01)
   *E03C 1/14*   (2006.01)

(56) References Cited

U.S. PATENT DOCUMENTS

2008/0069988 A1    3/2008  Sato
2009/0298977 A1*  12/2009  Kawahara ............... C08L 67/04
                                                              524/99

FOREIGN PATENT DOCUMENTS

| JP | 2007-092038 A | 4/2007 |
| JP | 2007-154079 A | 6/2007 |
| JP | 2007-260923 A | 10/2007 |
| JP | 2007-260927 A | 10/2007 |
| JP | 2008-088204 A | 4/2008 |
| JP | 2008-150598 A | 7/2008 |
| JP | 2008150598 A * | 7/2008 |
| WO | WO 2009/117509 A1 | 9/2009 |

OTHER PUBLICATIONS

International Search Report for corresponding International Application No. PCT/JP2011/056370 dated Apr. 19, 2011.
Chinese Office Action for corresponding Chinese Application No. 201180015478.6 dated Feb. 8, 2014, with English translation.
Pending claims of related U.S. Appl. No. 13/634,989.

* cited by examiner

MOLDING MATERIAL FOR A HOUSEHOLD PLUMBING EQUIPMENT AND A HOUSEHOLD PLUMBING EQUIPMENT FABRICATED USING THE SAME

TECHNICAL FIELD

This invention relates to a molding material for a household plumbing equipment containing a thermoplastic resin and a household plumbing equipment fabricated using the molding material.

BACKGROUND ART

Conventionally, some of thermoplastic resins such as a polypropylene resin (PP), a polybutylene terephthalate resin (PBT), and a polymethyl methacrylate resin (PMMA) have been used for fabricating household plumbing equipments such as a toilet, a hand wash basin, or a face wash basin.

The thermoplastic resin has superior shape forming characteristics and has a cost advantage. However, the thermoplastic resins have disadvantages as well as advantages in physical property. Therefore, the thermoplastic resin has not been used often for fabricating the household plumbing equipment exemplified above. Also, the thermoplastic resins is limited of its intended use depending on the characteristics thereof.

As an example, the polypropylene resin has superior chemical resistance and superior solvent resistance, but has low surface hardness. For this reason, it has been used mainly for fabricating a toilet for care (a toilet) etc. of household plumbing equipments.

The polybutylene terephthalate resin has superior chemical resistance and superior solvent resistance, but has low surface hardness and inferior durability of water-resistance. For this reason, it has been used mainly for fabricating a hand wash basin etc. of household plumbing equipments.

The polymethyl methacrylate resin has superior water resistance and superior weather resistance, and further, it has superior (higher) surface hardness compared with the polypropylene resin and the polybutylene terephthalate resin. That is, the polymethyl methacrylate resin has the above described superior characteristics for use in the above-exemplified household plumbing equipments. However, it has inferior solvent resistance. For this reason, it has been used mainly for fabricating a household toilet etc. of household plumbing equipments.

Besides, patent literature 1 describes a molding material, which is made by combining a thermoplastic resin composed mainly of the poly trimethylene terephthalate resin with various addition ingredients. In the patent literature 1, this molding material is used for fabricating some parts of a handrail, which may be used in a wet condition. However, this molding material is not suitable, in aspect of the physical property, for fabricating the above-exemplified household plumbing equipments, considering that it is composed mainly of the poly trimethylene terephthalate resin and considering the characteristics of combined material with the various addition ingredients.

CITATION LIST

Patent Literature

PATENT LITERATURE 1: JAPANESE PATENT APPLICATION PUBLICATION No. 2003-231797A.

SUMMARY OF INVENTION

Technical Problem

As described above, the polymethyl methacrylate resin has superior surface hardness as well as superior water resistance. That is, the polymethyl methacrylate resin has the advantages for use in the household plumbing equipment that the other thermoplastic resins do not have. However, because the polymethyl methacrylate resin has inferior solvent resistance, a chemical stress phenomena may be caused when a solvent medium acts at a place where a large residual strain exists. Therefore, there is a problem that it is likely to generate a so-called chemical crack.

Therefore, it has been expected such a technology of improving the solvent resistance of the molding material while assuring the advantages of the polymethyl methacrylate resin for use in the household plumbing equipment.

The present invention is developed in view of the above circumstances. The object of the present invention is to provide: a molding material for a household plumbing equipment which has superior surface hardness as well as superior water resistance for use in the household plumbing equipment inherent from the polymethyl methacrylate resin, and yet has improved solvent resistance; and a household plumbing equipment fabricated using the molding material.

Solution to Problem

In order to achieve the above object, the present invention is characterized as follows.

In the first, a molding material for a household plumbing equipment of the present invention contains a thermoplastic resin comprising a polymethyl methacrylate resin and a polytrimethylene terephthalate resin in a mass ratio of 90:10-50:50.

It is preferred that the molding material of the present invention is adapted for use in fabrication of the household plumbing equipment which is installed or adapted within a house for use in a wet condition.

It is preferred that the molding material of the present invention is adapted for use in fabrication of the household plumbing equipment including a toilet, a hand wash basin, a face wash basin, a wash-related small article, a bathroom shelf, a bathtub, and a bathroom small article.

In the second, a household plumbing equipment of the present invention is fabricated from the molding material of the first invention.

It is preferred that the household plumbing equipment of the present invention comprises an equipment which is installed or adapted within a house for use in a wet condition.

It is preferred that the household plumbing equipment of the present invention includes a toilet, a hand wash basin, a face wash basin, a wash-related small article, a bathroom shelf, a bathtub, and a bathroom small article.

Advantageous Effects of Invention

The above described first invention can assure superior surface hardness as well as superior water resistance inherent from the polymethyl methacrylate resin for use in the household plumbing equipment, and yet provide sufficient solvent resistance resulting from the combination of the polytrimethylene terephthalate resin to the polymethyl methacrylate resin to the household plumbing equipment.

The above described second invention is allowed to have sufficient surface hardness as well as sufficient water resistance for use in the household plumbing equipment, and yet have sufficient solvent resistance for the household plumbing equipment resulting from the combination of the polytrimethylene terephthalate resin to the polymethyl methacrylate resin.

DESCRIPTION OF EMBODIMENTS

Figure 1:
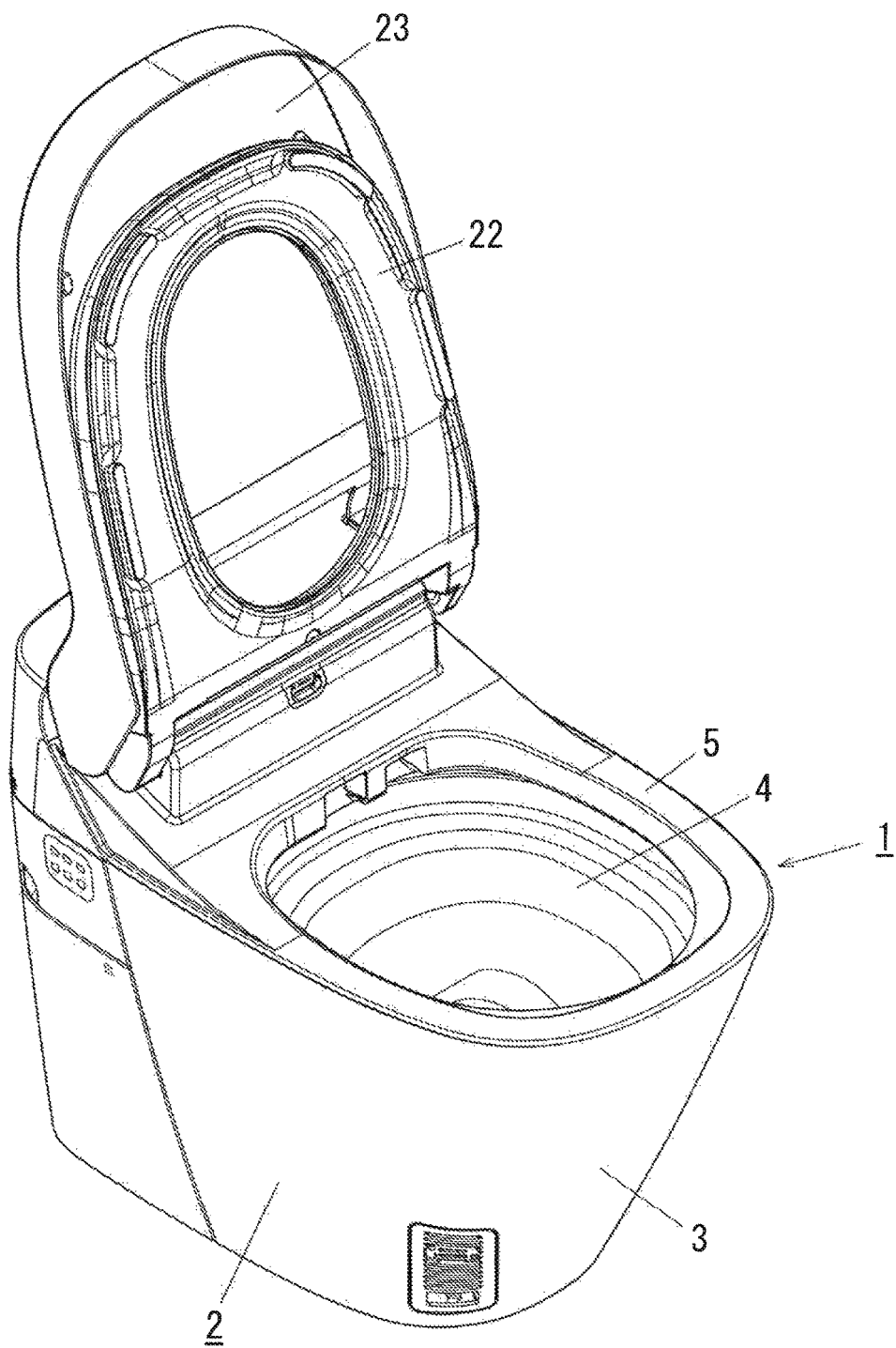
FIG. 1 shows a perspective view of a toilet device according to an embodiment of the present invention.

An embodiment of the present invention is described in detail below.

The molding material for a household plumbing equipment according to the present embodiment contains a thermoplastic resin comprising a polymethyl methacrylate resin and a polytrimethylene terephthalate resin in a mass ratio of 90:10-50:50.

According to the molding material for a household plumbing equipment of the present embodiment, it contains the thermoplastic resin including the polymethyl methacrylate resin as the main component and the poly trimethylene terephthalate resin combined in the above described specific mass ratio. As a result, it can assure superior surface hardness as well as superior water resistance inherent from the polymethyl methacrylate resin for use in the household plumbing equipment, and yet provide sufficient solvent resistance resulting from the combination of the polytrimethylene terephthalate resin to the polymethyl methacrylate resin to the household plumbing equipment.

The household plumbing equipment of the present embodiment is fabricated from the above described molding material.

According to the household plumbing equipment of the present embodiment, it is fabricated using the molding material according to the above described present embodiment. As a result, it has sufficient surface hardness and sufficient water resistance for use in the household plumbing equipment inherent from the polymethyl methacrylate resin of the main component, and yet has sufficient solvent resistance for use in the household plumbing equipment resulting from the combination of the polytrimethylene terephthalate resin to the polymethyl methacrylate resin.

The household plumbing equipment includes an equipment which is installed or adapted within a house for use in a wet condition.

The molding material for a household plumbing equipment of the present embodiment is characterized in that it contains the thermoplastic resin comprising the polymethyl methacrylate resin as the main component and the poly trimethylene terephthalate resin, thereby it can assure superior surface hardness as well as superior water resistance inherent from the polymethyl methacrylate for use in the household plumbing equipment and yet can have improved solvent resistance.

The polymethyl methacrylate resin, which can be used in the present embodiment as the main component, includes methyl methacrylate homopolymer, and copolymer of methyl methacrylate and other monomer.

The copolymer of the methyl methacrylate and the other monomer is preferred to contain the methyl methacrylate unit in more than 80% by mass. The other monomer which can be used with the methyl methacrylate includes, for example, alkyl acrylate, alkyl methacrylate, and aromatic vinyl monomer such as styrene and α-methylstyrene. These monomers may be used alone or in combination.

The alkyl acrylate is preferred to have an alkyl group whose carbon number is in the range of 1 to 18. The alkyl group in the present embodiment includes, for example, methyl group, ethyl group, n-propyl group, n-butyl group, 2-ethylhexyl group, dodecyl group, stearyl group, and so on. These alkyl acrylate may be used alone or in combination.

The alkyl methacrylate is preferred to have an alkyl group whose carbon number is in the range of 2 to 18. The alkyl group in the present embodiment includes, for example, ethyl group, n-propyl group, n-butyl group, 2-ethylhexyl group, dodecyl group, stearyl group, and so on. These alkyl methacrylate may be used alone or in combination.

The weight-average molecular weight of the polymethyl methacrylate resin is properly determined in consideration of the flowability during fabrication, the chemical resistance, the strength of the molded article, and so on. For example, the weight-average molecular weight thereof measured by GPC (gel permeation chromatography) is in the range of 70000-170000 with using a polystyrene as a standard sample. Measurement by GPC is performed, for example, in the following condition.

Device: HLC-8120GPC (manufactured by TOSOH Corporation)
Eluent: chloroform
Detector: differential refractometer
Temperature: 40 degrees Celsius Method for producing the polymethyl methacrylate resin is not particularly limited, and it can be produced by a known radical polymerization method such as bulk polymerization, solution polymerization, or suspension polymerization.

The poly trimethylene terephthalate resin which can be used in the present embodiment includes those in which a terephthalic acid is used as the main component of the acid component and a trimethylene glycol is used as the main component of the glycol component. Glycol ester is generated by the reaction of the acid component and the glycol component. The poly trimethylene terephthalate resin is produced by condensation polymerization of the glycol ester.

The other acid component other than the terephthalic acid which can be used includes, for example, aromatic dicarboxylic acid such as phthalic acid, isophthalic acid, 2,6-naphthalenedicarboxylic acid, diphenyl dicarboxylic acid, diphenyl ether dicarboxylic acid, diphenoxyethane dicarboxylic acid, diphenyl methane dicarboxylic acid, diphenyl ketone dicarboxylic acid, and diphenyl sulfone dicarboxylic acid; aliphatic dicarboxylic acid such as succinic acid, adipic acid, and sebacic acid; alicycle group dicarboxylic acid such as cyclohexanedicarboxylic acid; and oxydicarboxylic acid such as ε-oxycaproic acid, hydroxybenzoic acid, and hydroxyethoxy benzoic acid. These acid components may be used alone or in combination. The terephthalic acid preferably accounts for equal to or more than 80% by mol of the acid component.

The trimethylene glycol which can be used includes, for example, 1,3-propanediol, 1,2-propanediol, 1,1-propanediol, and 2,2-propanediol. These trimethylene glycols may be used alone or in combination. It is preferred to use the 1,3-propanediol in terms of stability. The 1,3-propanediol preferably accounts for equal to or more than 80% by mol of the glycol component.

The trimethylene glycol may be derived from a plant. Usage of the plant-derived trimethylene glycol allows to reduce the load on the environment.

The other glycol component which can be used includes, for example, ethylene glycol, tetramethylene glycol, pentamethylene glycol, hexamethylene glycol, octamethylene glycol, neopentylglycol, cyclohexanedimethanol, xylylene glycol, diethylene glycol, polyoxyalkylene glycol, and hydroquinone. These glycol components may be used alone or in combination.

The poly trimethylene terephthalate resin which can be used includes those in which a branching component is copolymerized. The branching component includes, for example, trifunctional or tetrafunctional acid having ester formation capability such as tricarballylic acid, trimesic acid, and trimellitic acid; and trifunctional or tetrafunctional alcohol having ester formation capability such as glycerin, trimethylol propane, and pentaerythritol. These branching components may be used alone or in combination. It is preferred that amount of the branching component is equal to or less than 1% by mol of total amount of the dicarbon acid component.

The weight-average molecular weight of the poly trimethylene terephthalate resin is, for example, in the range of 5000-100000 measured by the above described method (same method with measuring the polymethyl methacrylate resin).

Method for producing the poly trimethylene terephthalate resin is not particularly limited, and it can be produced, for example, by following processes. Firstly, heating to react the terephthalic acid or ester-forming derivative thereof (for example, lower alkyl ester such as dimethyl ester, and monomethyl ester) with the trimethylene glycol or ester-forming derivative thereof under proper temperature and proper time in the presence of catalyst, thereby forming the glycol ester of the terephthalic acid. Then, the poly trimethylene terephthalate resin is produced by polycondensation reaction of the glycol ester of the terephthalic acid to a desired polymerization degree under proper temperature and proper time in the presence of catalyst.

The molding material for a household plumbing equipment of the present embodiment contains a thermoplastic resin comprising the polymethyl methacrylate resin and the polytrimethylene terephthalate resin in a mass ratio of 90:10-50:50. In case that the mass ratio of the polymethyl methacrylate resin excesses 90, the solvent resistance of the molding material may be insufficient for use in the household plumbing equipment. In case that the mass ratio of the polymethyl methacrylate resin is less than 10, the surface hardness or the water resistance of the molding material may be insufficient for use in the household plumbing equipment.

As described above, the mass ratio between the polymethyl methacrylate resin and the polytrimethylene terephthalate is 90:10, or the rate of the polymethyl methacrylate resin is smaller than the above value. It is further preferred that the mass ratio therebetween is 75:25, or the rate of the polymethyl methacrylate resin is smaller than the above value. On the other hand, the mass ratio between the polymethyl methacrylate resin and the polytrimethylene terephthalate is 50:50, or the rate of the polymethyl methacrylate resin is greater than the above value. It is further preferred that the mass ratio therebetween is 65:35, or the rate of the polymethyl methacrylate resin is greater than the above value. It is particularly preferable that the mass ratio of the polymethyl methacrylate resin and the polytrimethylene terephthalate is in the range of 75:25-65:35.

The molding material for a household plumbing equipment of the present embodiment can further contain another thermoplastic resin other than the polymethyl methacrylate resin or the poly trimethylene terephthalate resin, so long as not disturbing the effect of the present invention. The other thermoplastic resin which can be used includes, for example, olefin type resin such as polycarbonate resin, polyethylene resin, and polypropylene resin; styrene type resin such as polystyrene resin, rubber-reinforced polystyrene resin, acrylonitrile-styrene copolymer resin, and ABS resin; polyacetal resin; polyamide resin; modified polyphenylene oxide resin; polyphenylene sulfide resin; fluorine resin; and silicon resin.

In order to properly exhibit the effect of the present invention for use in the household plumbing equipment, amount of the other thermoplastic resin is equal to or less than 20% by mass of total amount of the thermoplastic resin including the polymethyl methacrylate resin and the polytrimethylene terephthalate resin. It is further preferred that the amount thereof is equal to or less than 10% by mass.

The molding material for a household plumbing equipment of the present embodiment can further contain an addition ingredient other than the thermoplastic resin, so long as not disturbing the effect of the present invention. The addition ingredient which can be used includes, for example, an antioxidant, a thermal stabilizer, a mold release agent, lubricant agent, and a weather resistant agent. In order to properly exhibit the effect of the present invention for use in the household plumbing equipment, amount of the addition ingredients is equal to or less than 10% by mass of total amount of the thermoplastic resin. It is further preferred that the amount thereof is equal to or less than 1% by mass.

The molding material for a household plumbing equipment of the present embodiment can further contain a granular or fibrous inorganic filler, and/or a colorant such as pigment or dye, other than the above described addition ingredients, so long as not disturbing the effect of the present invention. In order to properly exhibit the effect of the present invention for use in the household plumbing equipment, amount of the inorganic filler is equal to or less than 30% by mass of total amount of the thermoplastic resin. It is further preferred that the amount thereof is equal to or less than 10% by mass. Besides, in order to properly exhibit the effect of the present invention for use in the household plumbing equipment, amount of the colorant is equal to or less than 5% by mass of total amount of the thermoplastic resin. It is further preferred that the amount thereof is equal to or less than 1% by mass.

The molding material for a household plumbing equipment of the present embodiment can be obtained in a pellet form by means of, combining the above described thermoplastic resins and the other addition components if needed, mixing with heat thereof under molten state by use of such as a biaxial kneader, being cooled, and being cut in a desired shape.

The obtained molding material for a household plumbing equipment is molded, for example, by injection molding or extrusion molding, thereby the household plumbing equipment can be fabricated.

The household plumbing equipment of the present embodiment can assure superior surface hardness, superior water resistance and superior weather resistance etc. for use in the household plumbing equipment inherent from the polymethyl methacrylate of the main component, and yet can have improved solvent resistance, especially a chemical crack resistance, resulting from the combination of the poly trimethylene terephthalate resin to the polymethyl methacrylate resin. The household plumbing equipment of the present embodiment preferably includes a toilet such as a toilet for care and a household toilet; a hand wash basin; a face wash basin; a wash-related small article such as a toothbrush rack, a bathroom shelf, a bathtub, and a bathroom small article such as a soap case.

Figure 2:
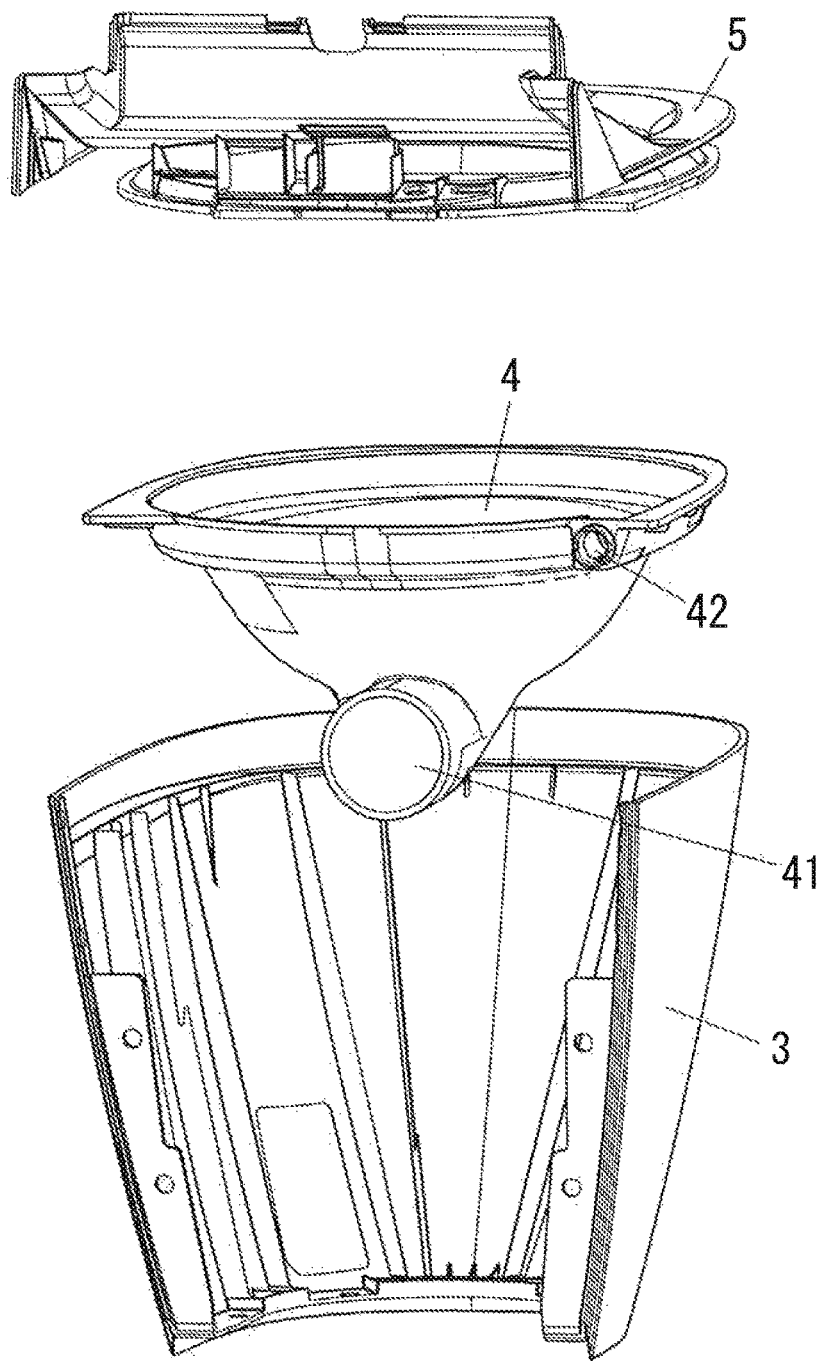
FIG. 2 shows an exploded perspective view of a toilet main body of the toilet device.

A specific aspect of the household plumbing equipment of the present embodiment is described below. FIG. 1 shows a toilet device 1. The toilet device 1 includes a toilet main body 2, a toilet seat 22, and a lid 23. FIG. 2 is an exploded perspective view showing the toilet main body 2. The toilet main body 2 includes a skirt 3, a rim 5, and a toilet bowl 4. The skirt 3 is configured to cover the side surface of the toilet main body 2. The rim 5 is formed in a ring-shape, and is attached to the top end of the skirt 3. The toilet main body 2 is formed to have a hole which opens upward in the inner side of the rim 5. The toilet bowl 4 is formed in a bowl shape which opens upwardly. The toilet bowl 4 is fixed in the hole of the toilet main body 2, and the surface of the toilet bowl 4 is exposed in the hole. The toilet bowl 4 is formed to have a discharge outlet 41 at the bottom thereof for discharging the water etc. from the toilet bowl 4. The toilet bowl 4 is formed to have a water inlet 42 at the upper portion thereof for providing water in the toilet bowl 4. Under normal use of the toilet device 1, the water is always stored in the toilet bowl 4. After a user uses the toilet device 1, a washing water is provided in the toilet bowl 4 through the water inlet 42, and the water and a sewage in the toilet bowl 4 is discharged through the discharge outlet 41.

Especially, the toilet bowl 4 in the toilet device 1 is preferably fabricated from the molding material for a household plumbing equipment of the present embodiment. In this case, the toilet bowl 4, which is always subjected to the water, has improved surface hardness and improved water resistance. As a result, durability of the toilet bowl 4 can be improved. In addition, the toilet bowl 4 has superior solvent resistance. As a result, the toilet bowl 4 can have improved durability even when the toilet bowl 4 is washed with detergent. The rim 5 or the skirt 3 included in the toilet main body 2 may be fabricated from the polymethyl methacrylate resin in which the polytrimethylene terephthalate resin is not included. However, it is preferred that these parts are fabricated from the molding material for a household plumbing equipment of the present embodiment.

Example

In the following, the present invention is described in further detail by examples. Note that, the present invention is not limited thereto.

The following materials are used for the thermoplastic resin in the examples.
Polymethyl Methacrylate Resin (PMMA)
  polymethyl methacrylate: "ACRYPET VH" (manufactured by MITSUBISHI RAYON Co., Ltd.)
Poly Trimethylene Terephthalate Resin (PTT)
  "DuPont Biomax PTT1100" (manufactured by DU PONT-MITSUI POLYCHEMICALS Co., Ltd.)
Polybutylene Terephthalate Resin (PBT)
  "DURANEX 2002" (manufactured by WinTech Polymer Ltd.)
(Producing Method of the Test Piece)

With regard to the working examples 1 to 3 and the comparative example 4, by using a biaxial kneader, the thermoplastic resins were mixed with heat in the blend ratio shown in the Table 1, and extruded in a strand shape. After cooling it, it was cut to prepare a pellet for molding. The test piece was produced with an injection machine by using the pellet for molding as the molding material.

With regard to the comparative examples 1 to 3, the test piece was produced with the injection machine by manufacturers' made-pellet as the molding material.

These test pieces were evaluated about the following characteristics.

[Pencil Hardness]

The pencil hardness of the test piece was measured based on JIS K5600.

[Fouling Test]

The test piece was evaluated based on "fouling test item" in JIS A1718. In this test, vaseline/carbon black was attached to and removed from the test piece. After then, it was confirmed about the presence of the residue by visual inspection. In this test, if the test piece has inferior scratch resistance, the test piece may be scratched when attaching thereto the vaseline/carbon black, and therefore the carbon remains at the scratched portion of the test piece as a pollution.

[Solvent Resistance (Chemical Crack Resistance)]

Test tools which had a particular convex curve were prepared. The test piece having 3 mm thickness and 15 mm width was positioned on the test tool so as to be bent along with the convex curve, and each side ends of the test piece was fixed to the test tool by a fastener. By bending and fixing the test piece on the convex curve of the test tool as described above, four kinds of strains, 0.15%, 0.30%, 0.45%, and 0.60% (stretch rates) were applied on the surface of the test piece.

In order to apply four kinds of strains, four types of test tools were prepared which having the convex curves of different curvature factors so as to stretch the surface of the test piece in the range of 0.15 to 0.60%. Four kinds of strains were applied to the test piece by using the four types of test tools.

Subsequently, it was prepared a tube body having the inner diameter of 5 mm. The tube body was fixed on the center portion of the test piece by silicon grease so that both end openings thereof respectively facing upward and downward, and an ethyl alcohol was filled in the inside of the tube body. Then, it was left stand for 24 hours at room temperature. Thereby, a "critical strain value" of the test piece was determined as a strain value, at which a break or a crack was generated at the ethyl alcohol-subjected place of the test piece.

[Izod Impact Strength]

Izod impact strength of unnotched test piece was measured based on JIS K7110. In this test, two kinds of test pieces, i.e. a non-treated piece and a warm water immersion treated piece for the evaluation of water resistance, were prepared. The warm water immersion treated piece was prepared by soaking the piece for 60 days in a warm water of 70 degrees Celsius, and then dried.

Evaluation results are shown in Table 1.

[Table 1]

Comparing the results of the working examples 1-3 (containing the thermoplastic resin in which PMMA and PTT were blended in a mass ratio of 90:10-50:50) with those of the comparative examples 2, 3 (in which PBT or PTT was used alone), it was found that the test pieces according to the working examples 1-3 had superior surface hardness as well as superior decontaminating characteristics. Also, referring to the results about Izod impact strength of the warm water immersion treated pieces, it was found that the test pieces according to the working examples 1-3 had superior water resistance.

Comparing the results of the working examples 1-3 with those of the comparative examples 1 (in which PMMA is used alone), it was found that the test pieces according to the working examples 1-3 had sufficient decontaminating characteristics for use in the household plumbing equipment, although these had a slightly decreased surface hardness than the comparative example 1 of PMMA alone. Also, referring to the results about Izod impact strength test of the warm water immersion treated pieces, it was found that the test pieces according to the working examples 1-3 had equivalent water resistance (that is, strength of the test piece after treating the warm water immersion) with the comparative example 1 of PMMA alone. Also, it was found that the test pieces according to the working examples 1-3 had superior solvent resistance than that of the comparative example 1 of PMMA alone.

Comparing the results of the working examples 1-3 with those of the comparative example 2 (in which PBT is used alone) and the comparative example 4 (in which PMMA and PBT were blended in a mass ratio of 50:50), it was found that the test pieces using PBT had inferior surface hardness and inferior Izod impact strength (that is, inferior impact resistance) than those using PTT. That is, it was revealed that PTT was particularly suitable as the material for reformulating PMMA for use in household plumbing equipment.

The invention claimed is:

1. A method of manufacturing a thermoplastic resin for a household plumbing equipment, comprising:
   reacting an acid component including 80% by mol or more of a terephthalic acid or ester-forming derivative thereof and a glycol component including 80% by mol or more of a trimethylene glycol derived from a plant or ester-forming derivative thereof to form a poly trimethylene terephthalate resin as a condensation polymer of a formed glycol ester of the terephthalic acid; and
   combining the poly trimethylene terephthalate resin with a polymethyl methacrylate resin in a mass ratio of 90:10-50:50 to form a thermoplastic resin, wherein the thermoplastic resin comprises the polymethyl methacrylate resin and the polytrimethylene terephthalate resin in an amount of 80% or more by mass of a total amount of the formed thermoplastic resin.

2. A method of manufacturing a household plumbing equipment, comprising fabricating the household plumbing equipment from the thermoplastic resin of claim 1.

3. A method of manufacturing a thermoplastic resin for a household plumbing equipment, comprising:
   reacting a terephthalic acid or ester-forming derivative thereof and a trimethylene glycol derived from a plant or ester-forming derivative thereof to form a poly trimethylene terephthalate resin as a condensation polymer of a formed glycol ester of the terephthalic acid; and
   combining the poly trimethylene terephthalate resin with a polymethyl methacrylate resin in a mass ratio of 90:10-50:50 to form a thermoplastic resin, wherein the thermoplastic resin comprises the polymethyl methacrylate resin and the polytrimethylene terephthalate resin in an amount of 80% or more by mass of a total amount of the formed thermoplastic resin.

4. A method of manufacturing a household plumbing equipment, comprising fabricating the household plumbing equipment from the thermoplastic resin of claim 3.

* * * * *